United States Patent
Xu et al.

(10) Patent No.: US 11,985,524 B2
(45) Date of Patent: May 14, 2024

(54) TIMING SYNCHRONIZATION FOR INTERCELL UE TO UE CROSS LINK INTERFERENCE MEASUREMENT

(71) Applicant: QUALCOMM Incorporated, San Diego, CA (US)

(72) Inventors: Huilin Xu, Temecula, CA (US); Hung Dinh Ly, San Diego, CA (US); Yiqing Cao, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 17/434,280

(22) PCT Filed: Feb. 4, 2020

(86) PCT No.: PCT/CN2020/074281
§ 371 (c)(1),
(2) Date: Aug. 26, 2021

(87) PCT Pub. No.: WO2020/192276
PCT Pub. Date: Oct. 1, 2020

(65) Prior Publication Data
US 2022/0141687 A1 May 5, 2022

(30) Foreign Application Priority Data
Mar. 25, 2019 (WO) ................ PCT/CN2019/079428

(51) Int. Cl.
*H04W 24/08* (2009.01)
*H04W 56/00* (2009.01)

(52) U.S. Cl.
CPC ....... *H04W 24/08* (2013.01); *H04W 56/0065* (2013.01)

(58) Field of Classification Search
CPC .............. H04W 24/08; H04W 56/0065; H04B 17/345; H04L 5/0073
See application file for complete search history.

(56) References Cited

U.S. PATENT DOCUMENTS 11,576,146 B1 * 2/2023 He ........................ H04W 24/08
2016/0227505 A1 8/2016 Loehr et al.
(Continued)

FOREIGN PATENT DOCUMENTS

| CN | 1889770 A | 1/2007 |
| CN | 108289325 A | 7/2018 |
| WO | 2018126792 A1 | 7/2018 |
| WO | 2018128297 A1 | 7/2018 |

OTHER PUBLICATIONS

Fujitsu: "Discussion on Cross-Link Interference Management", 3GPP TSG RAN WG1 Meeting NR#3, R1-1715493 Discussion on Cross-Link Interference Management Final, 3rd Generation Partnership Project, Mobile Competence Centre, 650, Route Des Lucioles, F-06921 Sophia-Antipolis, vol. RAN WG1, No. Nagoya, Japan, Sep. 18, 2017-Sep. 21, 2017 Sep. 17, 2017, XP051338961, pp. 1-4, Section 2.

(Continued)

*Primary Examiner* — Abdullahi Ahmed
(74) *Attorney, Agent, or Firm* — Procopio, Cory, Hargreaves & Savitch LLP/Qualcomm Incorporated

(57) ABSTRACT

A configuration for a UE that measures CLI to determine the reception timing of the CLI signal transmitted from a UE in another cell. Aspects of a method, apparatus, and computer-readable medium are presented herein that provide a solution to the problem of measuring CLI signals by improving the manner in which a wireless device determines the reception timing of a transmitted CLI signal. An apparatus receives a first downlink signal from a first base station. The apparatus receiving a second downlink signal from a second base station. The apparatus determines a CLI signal mea- (Continued)

surement from a second UE received at the first UE based on a propagation delay difference, the propagation delay difference being based on the first downlink signal and the second downlink signal.

24 Claims, 11 Drawing Sheets

(56) References Cited

U.S. PATENT DOCUMENTS

| | | | | |
|---|---|---|---|---|
| 2021/0400520 | A1* | 12/2021 | Sundberg | H04W 72/27 |
| 2022/0124531 | A1* | 4/2022 | Miao | H04B 17/345 |
| 2022/0231768 | A1* | 7/2022 | Kim | H04W 56/0005 |
| 2022/0255647 | A1* | 8/2022 | Sahraei | H04L 5/0053 |
| 2023/0224027 | A1* | 7/2023 | Liu | H04W 48/16 |
| | | | | 375/262 |
| 2023/0231638 | A1* | 7/2023 | Ren | H04B 17/345 |
| | | | | 370/252 |
| 2023/0266424 | A1* | 8/2023 | Ren | H04W 24/10 |
| | | | | 342/458 |

OTHER PUBLICATIONS

Huawei et al., "Discussion on UE-UE Measurement for CLI Management", 3GPP TSG RAN WG1 Ad-Hoc Meeting 1901, R1-1900052, 3rd Generation Partnership Project, Mobile Competence Centre, 650, Route Des Lucioles, F-06921 Sophia-Antipolis Cedex, France, vol. RAN WG1, No. Taipei, Jan. 21, 2019-Jan. 25, 2019 Jan. 20, 2019, XP051592978, 7 Pages, Section 3.
Supplementary European Search Report—EP20778278—Search Authority—Munich—dated Nov. 24, 2022.
International Search Report and Written Opinion—PCT/CN2020/ 074281—ISA/EPO—dated Apr. 24, 2020.
International Search Report and Written Opinion—PCT/CN2019/ 079428—ISA/EPO—dated Dec. 26, 2019.
Zte: "Discussion on Measurements and RS Design for CLI Mitigation", 3GPP TSG RAN WG1 Meeting #89, Draft; R1-1707204-7.1.6.1, 3rd Generation Partnership Project (3GPP), Mobile Competence Centre, 650, Route Des Lucioles, F-06921 Sophia-Antipolis Cedex, France, vol. RAN WG1, No. Hangzhou; May 15, 2017-May 19, 2017, May 14, 2017 (May 14, 2017), 9 Pages, XP051272419, From the Internet: URL: http://www.3gpp.org/ftp/Meetings_3GPP_ SYNC/RAN1/Docs/ [retrieved on May 14, 2017] paragraph [0001]-paragraph [05 .1] paragraph [06 .1] paragraph [0007].
Zte, et al., "Discussion on Measurements and RS Design for CLI Mitigation", R1-1700271, 3GPP TSG RAN WG1 AH_NR#1 Meeting, Spokane, Washington, USA, Jan. 16-20, 2017, pp. 1-8, Jan. 20, 2017, Sections 3.2-3.3, the whole document.
Zte, et al., "Discussion on Measurements and RS Design for CLI Mitigation", R1-1704434, 3GPP TSG RAN WG1 Meeting #88bis, Spokane, Washington, USA, Apr. 3, 2017-Apr. 7, 2017, 11 Pages, Apr. 23, 2017 (Apr. 23, 2017), Sections 3.2-3.3, Chapters 2 and 3.

* cited by examiner

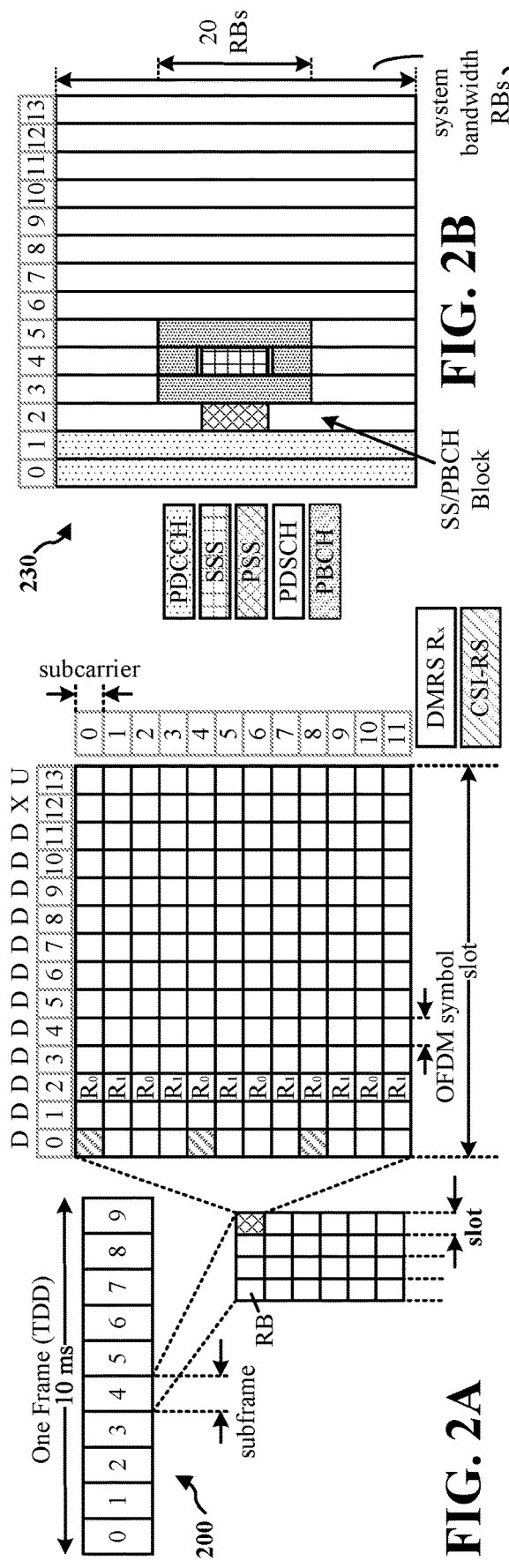
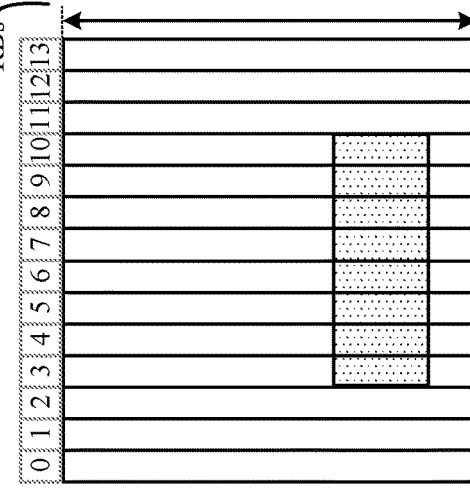
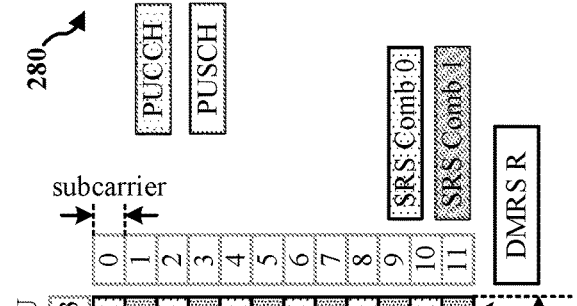
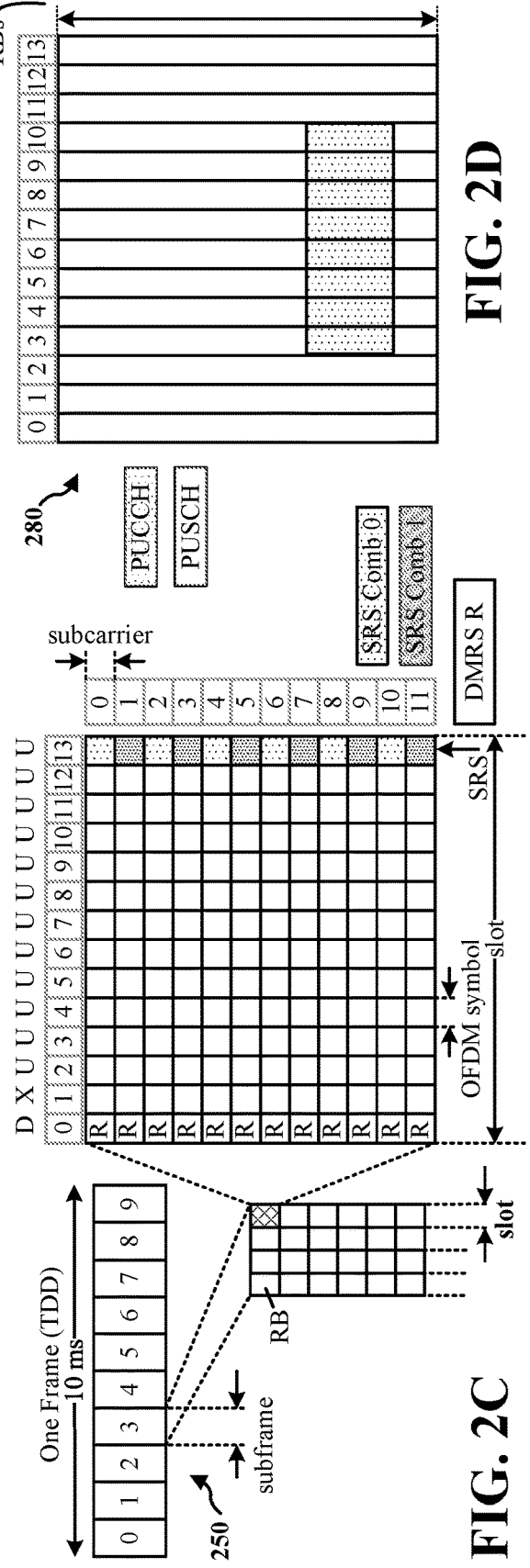

TIMING SYNCHRONIZATION FOR INTERCELL UE TO UE CROSS LINK INTERFERENCE MEASUREMENT

CROSS REFERENCE TO RELATED APPLICATION(S)

This application is a National Stage Application filed under 35 U.S.C. § 371 of PCT International Patent Application Serial No. PCT/CN2020/074281, entitled "Timing Synchronization for Intercell UE to UE Cross Link Interference Measurement", and filed on Feb. 4, 2020, which claims the benefit of International Application No. PCT/CN2019/079428, entitled "Timing Synchronization for Intercell UE to UE Cross Link Interference Measurement" and filed on Mar. 25, 2019, which is expressly incorporated by reference herein in its entirety.

TECHNICAL FIELD

The present disclosure relates generally to communication systems, and more particularly, to cross link interference measurements in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Dynamic time division duplex (TDD) may enhance spectrum efficiency of wireless communication networks. However, dynamic TDD may result in interference between User Equipment (UE), such as UE-to-UE cross link interference (CLI) when an uplink (UL) symbol of one cell collides with a downlink (DL) symbol of a nearby cell. A UE that measures CLI may attempt to determine the reception timing of the CLI signal transmitted from a UE in the other cell so that there is no inter-carrier interference in the measurement signal. Otherwise the UE may not properly measure the CLI signal. Aspects presented herein provide a solution to the problem of measuring CLI signals by improving the manner in which a wireless device determines the reception timing of a transmitted CLI signal. In some aspects, the techniques to determine the reception timing of the transmitted CLI signal may be optimized to allow a UE to accurately measure the CLI signal. The techniques to determine the reception timing of the transmitted CLI signal, as presented herein, may utilize information obtained in existing mobility control procedures without affecting the complexity of the UE implementation.

In an aspect of the disclosure, a method, a computer-readable medium, and an apparatus are provided for measuring CLI in wireless communications at a first UE. The apparatus receives a first downlink signal from a first base station. The apparatus receives a second downlink signal from a second base station. The apparatus determines a CLI signal measurement from a second UE received at the first UE based on a propagation delay difference. In some aspects, the propagation delay different may be based on the first downlink signal and the second downlink signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
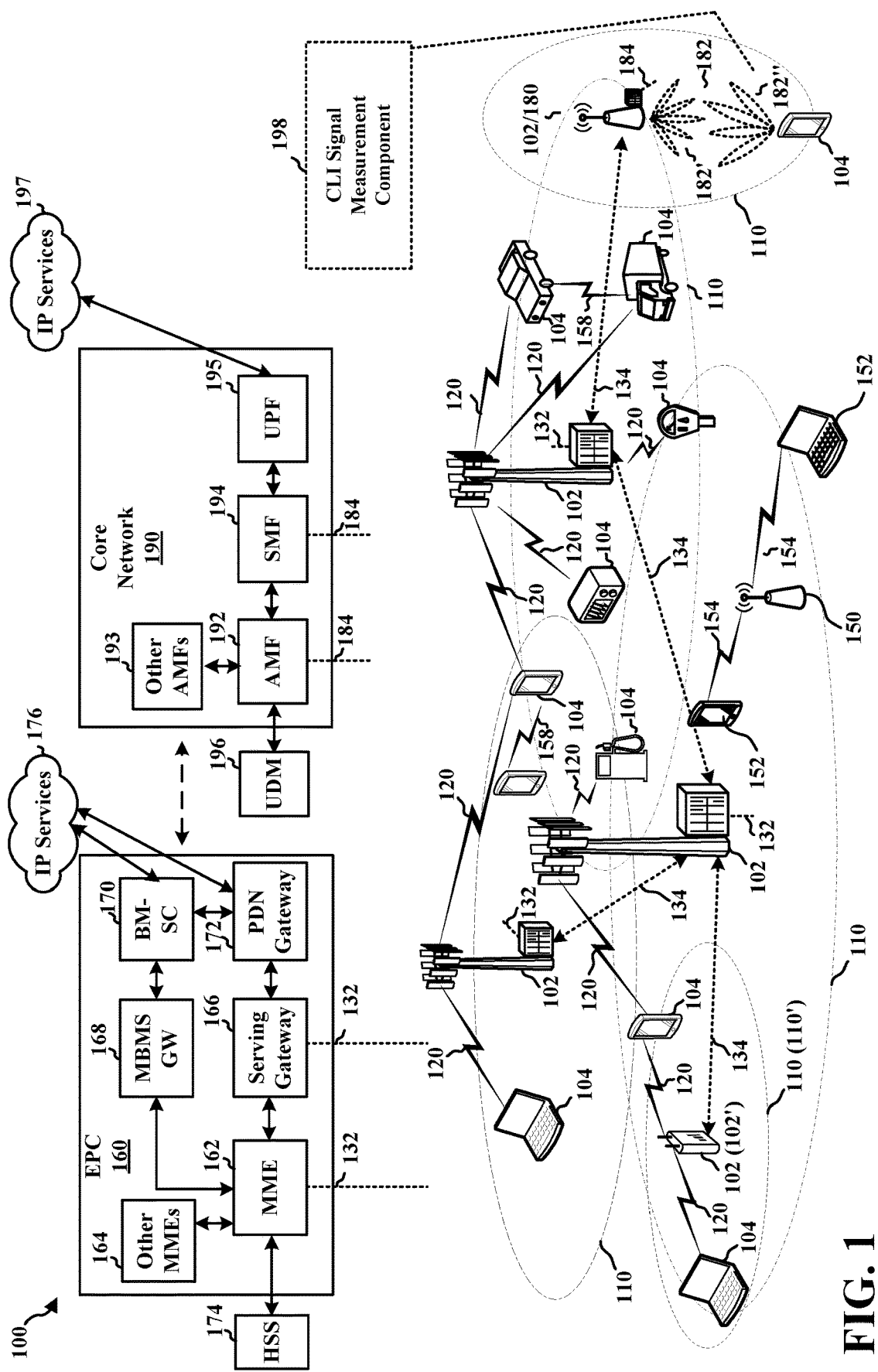
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage interference from UEs in other cells by measuring the interference signal from other UEs. For example, the UE 104 of FIG. 1 includes a CLI signal measurement component 198 configured to receive a first downlink signal from a first base station, receive a second downlink signal from a second base station, and determine a CLI signal measurement from a second UE received by the first UE 104 based on a propagation delay difference, in which the propagation delay difference is based on the first downlink signal and the second downlink signal.

Although the following description may be focused on implementations in which the UE manages interference from other UEs in other cells to effectively configure dynamic TDD, the concepts described herein may be applicable to other similar areas, such as instances when the base station is configured to manage interference from other UEs and/or other base stations and is configured to provide interference management instructions to the UE. Furthermore, it should be appreciated that although the following description is focused on 5G/NR, the concepts described herein may be applicable to other similar areas, such as LTE, LTE-A, CDMA, GSM, and/or other wireless technologies in which interference management is coordinated by the UE and/or the base station.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
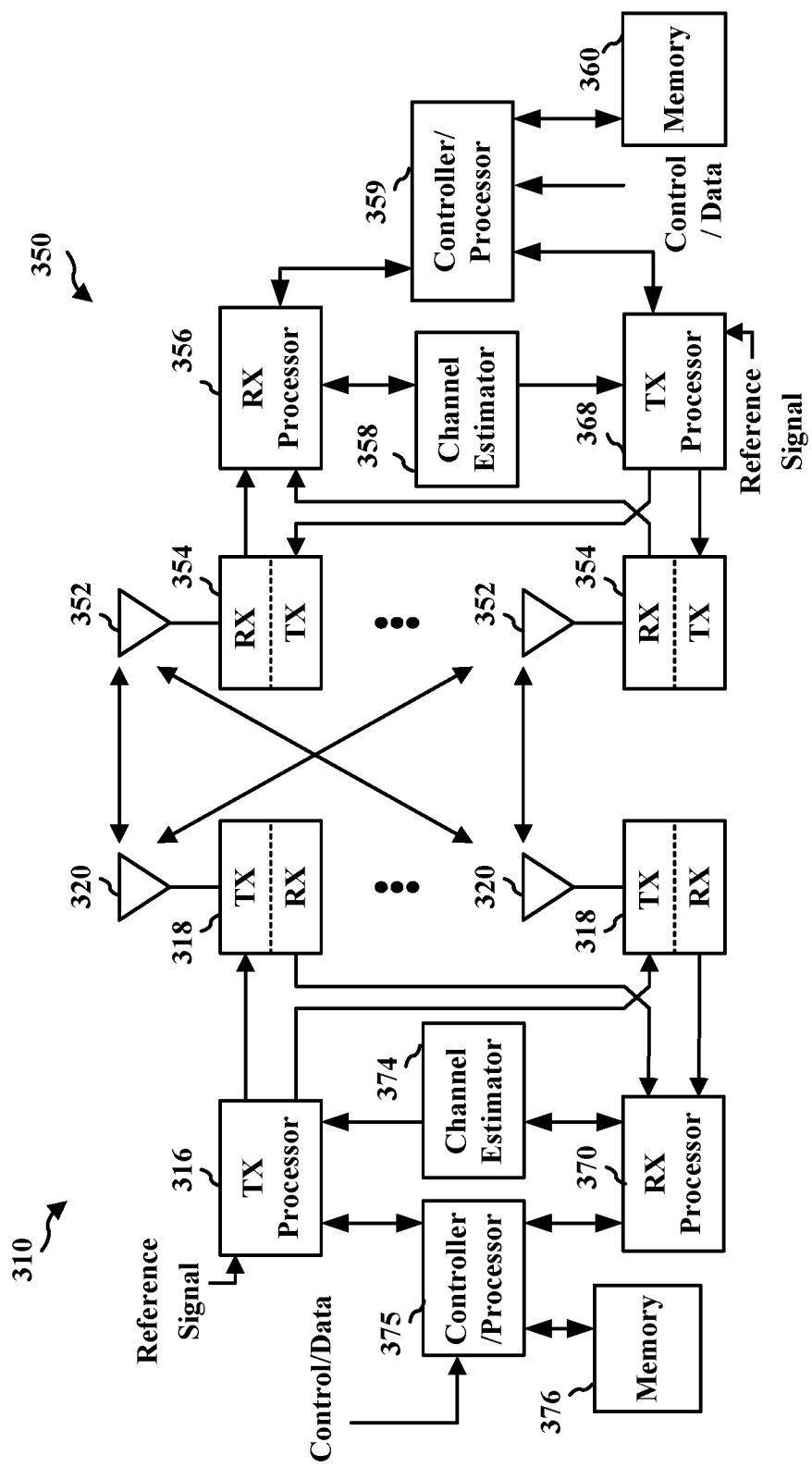
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 4:
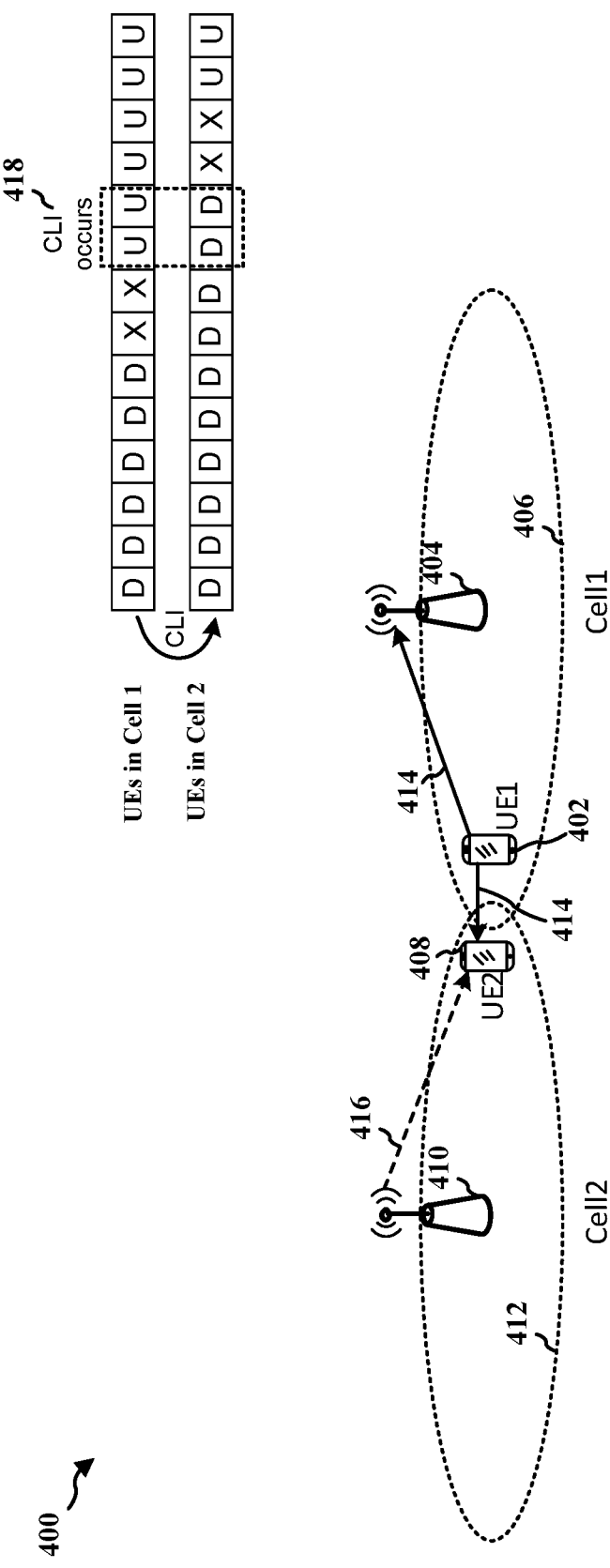
FIG. 4 is a diagram illustrating a wireless network operating in a dynamic TDD configuration in accordance with certain aspects of the disclosure.

FIG. 4 is a diagram illustrating a wireless network 400 operating in a dynamic TDD configuration in accordance with certain aspects of the disclosure. Dynamic TDD may enhance spectrum efficiency of wireless communication networks and provide a higher throughput by dynamically altering UL or DL transmission direction. However, dynamic TDD may result in UE-to-UE cross link interference. CLI occurs when a UL symbol (e.g., an interfering symbol) of a cell (e.g., an aggressor) collides with a DL symbol (e.g., an interfered symbol) of a nearby cell (e.g., a victim). The configuration of dynamic TDD is able to change dynamically in response to a change of traffic pattern. For example, in instances where the traffic pattern is UL heavy, dynamic TDD may recognize the change in the traffic pattern and adapt by providing more UL symbols to meet the demand. Alternatively, in instances where the traffic pattern is DL heavy, dynamic TDD may provide more DL symbols to meet the demand.

In FIG. 4, UE1 402 is within Cell1 406 and is being served by base station 404, while UE2 408 is within Cell2 412 and is being served by base station 410. CLI may occur between UEs at the cell edges of nearby cells, as UEs at cell edges of nearby cells may be in close proximity to each other. As shown in FIG. 4, UE1 402 and UE2 408 are at their respective cell edges, and may be communicating with their respective base stations. UE1 402 may send an UL transmission 414 to base station 404, while UE2 408 is receiving a DL transmission 416 from base station 410. However, in certain instances, the UL transmission 414 sent by UE1 402 to base station 404 may also be received by UE2 408 while receiving the DL transmission 416 from base station 410. The UL transmission 414 from UE1 402 received by UE2 408 causes CLI and may interfere with the DL transmission 416 UE2 408 from base station 410. As such, one or more UL symbols of the UL signal 414 causing the CLI may collide with one or more DL symbols of the DL transmission 416. As used herein, the term CLI signal is defined to be a signal that causes CLI. As further used herein, the terms CLI signal and CLI may be used interchangeably.

In the example of FIG. 4, two UL symbols of the UL signal 414 causing CLI overlap or collide with two DL symbols of the DL transmission 416, such that CLI occurs at the overlap 418. In order to manage CLI and also effectively configure dynamic TDD configuration for a higher throughput, a measurement mechanism and an interference management mechanism could be helpful. However, CLI may not be effectively measured if the UL transmissions of UE1 are not properly time synchronized with the DL transmission intended for UE2. A UE (e.g., UE2 of FIG. 4) that measures CLI may determine the reception timing of the UL signal 414 causing the CLI that is transmitted from a UE (e.g., UE1 of FIG. 4) in another cell so that there is no inter-carrier or inter-symbol interference in the measurement signal.

If timing synchronization is not done properly, then the energy measurement signal of the CLI power may be incorrect. Also, interference may occur among measurement signals in instances where multiple measurement signals are multiplexed in the frequency domain. As such, strong CLI from one UE may hide a weaker CLI from another UE. CLI measurements may be based on the reference signal received power (RSRP) from the interfering SRS transmitted by UE1 402, or on the received signal strength indication (RSSI) from any UL transmission from UE1 402. In order for a UE to measure a CLI based on RSRP, a dedicated time tracking loop may be used for the interfering SRS, which may increase the UE complexity. UEs measuring the CLI based on RSSI do so upon detection of the initial energy detection from a transmission causing CLI. However, this is a non-coherent detection and is vulnerable to noise and interference from other concurrent signals.

One approach to synchronize the timing is to assume that two cells are small cells. Under this approach, the propagation delay between each UE and the respective serving base station can be ignored, on the basis that a transmission from a small cell is immediately received by a UE due in part to the small coverage footprint of small cells. Under this assumption, the timing difference between the CLI signal received at UE2 408 and the DL symbol boundary for UE2 408 is equal to $N_{TA,offset}$, which is a constant offset which allows the base station to switch between UL and DL. Another approach to synchronize the timing is to assume that the two cells have the same radius, such that the distance between the UEs and the respective base stations are the same. Under this assumption, the propagation delay for both UEs would be the same, such that the CLI from one UE (e.g., UE1 402) is time aligned with the UL symbol boundary of the other UE (e.g., UE2 408). These two approaches rely on assumptions that may not always be accurate. For example, the first approach relies on the assumption that both cells are small cells, while the second approach relies on the assumption that both cells have the same coverage radius. These approaches may work in certain settings, but may not be viable in other situations, such that the reception timing of the CLI signal may not be set accurately. Aspects presented herein help a wireless device to accurately determine the reception timing of CLI signals to allow a UE to properly measure CLI signals.

The present disclosure relates to improving the manner in which a wireless device determines the reception timing of a transmitted CLI signal. Optimizing the manner in which a wireless device determines the reception timing of a transmitted CLI signal may allow a network to manage CLI and efficiently configure dynamic TDD for higher throughput.

For example, a UE in the network could minimize or eliminate inter-carrier interference in the measurement of the CLI signal due to accurately determining the reception timing of the CLI signal transmitted from another UE. In some aspects, the UE may utilize information obtained in received DL signals in order to determine a CLI signal measurement, and does not have to rely on assumptions that may not be applicable to real-world applications.

Figure 5:
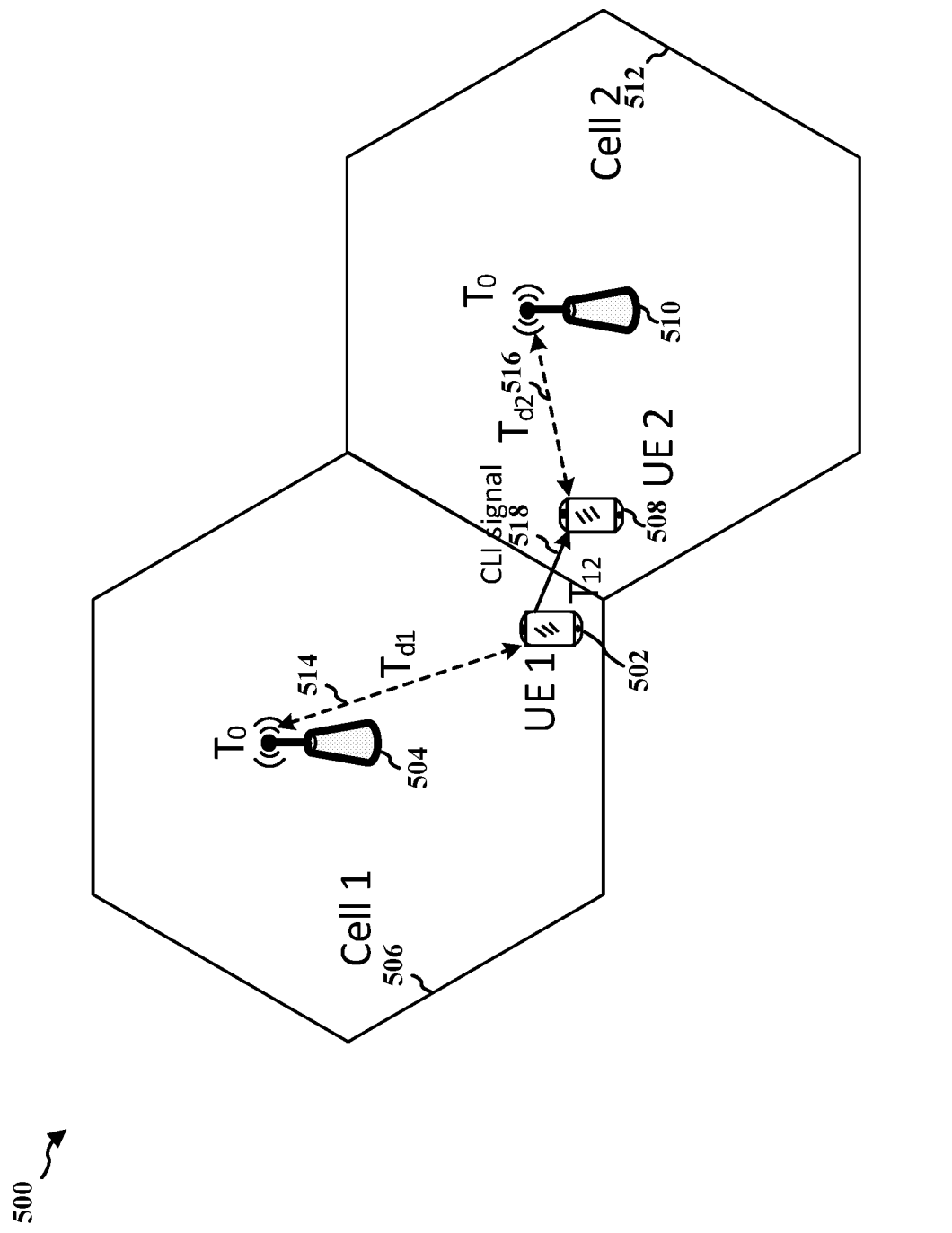
FIG. 5 is a diagram illustrating timing relationships of UEs in a wireless network in accordance with certain aspects of the disclosure.

FIG. 5 is a diagram 500 illustrating timing relationships of UEs in a wireless network in accordance with certain aspects of the disclosure. The diagram 500 of FIG. 5 includes a UE1 502 within a Cell1 506 and is being served by base station 504 via a communication link 514. The diagram 500 further includes a UE2 508 within a Cell2 512 and is being served by base station 510 via a communication link 516. Cell1 506 and Cell2 512 are neighbor cells, while UE1 502 and UE2 508 are near the edge of their respective cells. UE1 502 is able to transmit UL signals to base station 504 and receive DL signals from base station 504 via link 514. UE2 508 is able to transmit UL signals to base station 510 and receive DL signals from base station 510 via link 516. However, since UE1 and UE2 are near the respective cell edges, both may be susceptible to CLI. In some aspects, when UE1 502 is transmitting UL signals 518 to base station 504, the UL signals 518 may be received by UE2 508 as CLI. The UL signals 518, transmitted by UE1, are received by UE2 as CLI signals (e.g., UL signals 518 causing CLI) that may cause interference with the DL signals transmitted to UE2 508 from base station 510. As discussed above, a UE may attempt to determine the timing of the interference to align and/or synchronize the measurement of the interfering signal. A UE (e.g., UE2 508) that measures CLI may attempt to determine the reception timing of the CLI signal 518 transmitted from a UE (e.g., UE1 502) within another cell.

In the aspect of FIG. 5, UE1 and UE2 are in different cells (e.g., Cell1 506 and Cell2 512, respectively). However, in some aspects, UE1 and UE2 may be within the same cell and served by the same base station. In such aspects, if UE1 502 and UE2 508 are near each other, UE1 502 may transmit UL signals 518 to the base station (e.g., base station 504 or 510), the UL signals 518 may be received by UE2 508 as CLI, as discussed above. The UL signals 518, transmitted by UE1, may be received by UE2 as UL signals 518 causing CLI that may cause interference with DL signals transmitted to UE2 508 from the base station (e.g., base station 504 or 510). In such instances, a UE may attempt to determine the timing of the interference to align and/or synchronize the measurement of the interfering signal, similarly as discussed above.

Figure 6:
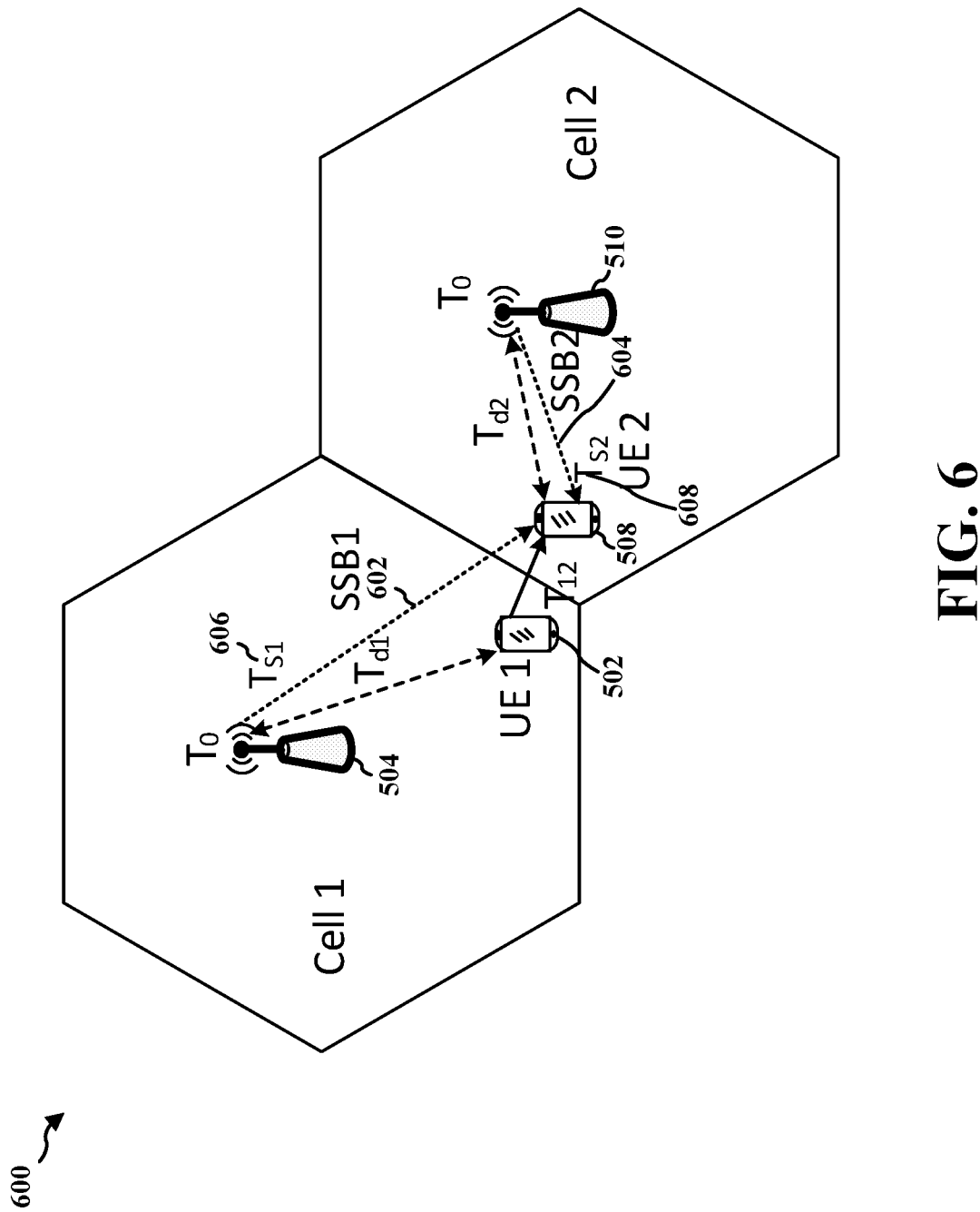
FIG. 6 is another diagram illustrating timing relationship of UEs in a wireless network in accordance with certain aspects of the disclosure.
Figure 7:
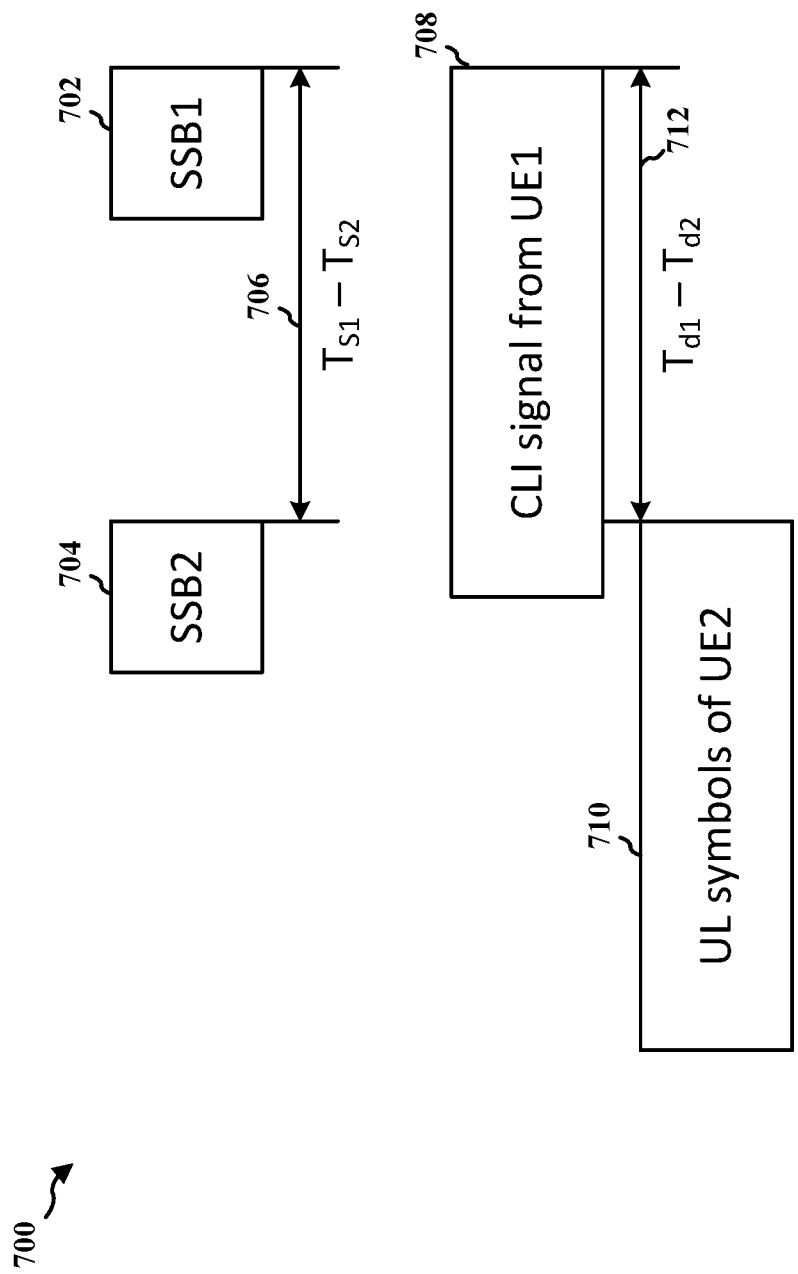
FIG. 7 is a diagram illustrating the comparison of propagation delay and channel delay of UL and DL transmissions in accordance with certain aspects of the disclosure.

In some aspects, a UE (e.g., UE2 508) may be configured to utilize the DL transmissions received from neighboring cells to determine a CLI signal measurement from another UE (e.g., UE1 502) received at the UE (e.g., UE2 508). For example, with reference to diagrams 600 and 700 FIGS. 6-7, respectively, UE2 508 may receive a first DL signal (e.g., DL signal 604, SSB2 704) from a first base station (e.g., base station 510), and further configured to receive a second DL signal (e.g., DL signal 602, SSB1 702) from a second base station (e.g., base station 504). FIG. 6 is a diagram 600 illustrating timing relationship of UEs in a wireless network in accordance with certain aspects of the disclosure, while FIG. 7 is a diagram 700 illustrating the comparison of propagation delay and channel delay of UL and DL transmissions in accordance with certain aspects of the disclosure. UE2 508 is within Cell2 and is being served by base station 510 but is close to the edge of Cell2 such that UE2 is in a position to receive the second DL signal from a neighbor cell (e.g., Cell1) as part of its mobility protocol, while the base station 504 is within a neighboring cell (e.g., Cell1). The UE2 may be configured to determine the timing difference of DL signal 602 and DL signal 604 to determine the propagation delay difference of DL signal 602 and DL signal 604. In some aspects, the first DL signal (e.g., DL signal 604) may comprise a first synchronization signal (e.g., SSB2 704) from the first base station (e.g., base station 510). In some aspects, the second DL signal (e.g., DL signal 602) may comprise a second synchronization signal (e.g., SSB1 702) from the second base station (e.g., base station 504). The propagation delay difference 706 may be based on the DL signal 602 and DL signal 604. In some aspects, the propagation delay difference may be determined based on a difference between a propagation time of DL signal 604 and a propagation time of DL signal 602. In some aspects, the propagation delay difference between the first DL signal (e.g., 604, 704) and the second DL signal (e.g., 602, 702) may be similar to a symbol timing difference between the first DL signal (e.g., 604) from the first base station (e.g., 510) and the second DL signal (e.g., 602) from the second base station (e.g., 504).

The UE (e.g., UE2 508) may determine the CLI signal measurement of the CLI signal (e.g., UL signal 518) based on the propagation delay difference. In some aspects, the UE (e.g., UE2 508) may determine a reception timing of the CLI signal (e.g., UL signal 518) based on the propagation delay difference between the first DL signal (e.g., 604) and the second DL signal (e.g., 602). The UE may utilize the reception timing of the CLI signal to determine the CLI signal measurement. In some aspects, to determine the CLI signal measurement, the UE (e.g., 508) may determine a symbol timing estimate between the CLI signal (e.g., UL signal 518) received at the first UE (e.g., UE2 508) and a signal between the first UE (e.g., 508) and the first base station (e.g., 510) that is interfered by the CLI signal (e.g., UL signal 518). The symbol timing estimate may be based on the symbol timing difference between the first DL signal (e.g., 604) and the second DL signal (e.g., 602).

At least one advantage is that the UE may utilize the timing relationship in neighboring cells to determine the CLI signal measurement based on DL signals that the UE already receives. For example, the UE2 may determine the symbol timing of the CLI signal (e.g., UL signal 518) at UE2 by determining the channel delay difference from the first base station (e.g., 510) to the first UE (e.g., UE2 508) and from the second base station (e.g., 504) to the second UE (e.g., UE1 502). The UE2 may determine its channel delay based on the synchronization signal (e.g., Synchronization Signal Block (SSB)) received in the DL signal from the first base station (e.g., 510). Although UE2 does not know the channel delay between UE1 and the second base station, UE2 may determine the channel delay between UE1 and the second base station based on the propagation delay of the second DL signal (e.g., 602) from the second base (e.g., 504) station received by UE2. The acquisition of synchronization signals (e.g., SSB) from neighboring cells may already be a part of a UE mobility control procedure, such that acquisition of the SSB does not increase the complexity of UE implementation.

A UE may utilize the timing relationship of two neighboring cells in order for the UE to align or synchronize the measurement with the transmitted symbols. For example, the DL symbol timing at the first base station (e.g., 510) and the second base station (e.g., 504) is $T_0$. The DL symbols at both base stations are timing synchronized in dynamic TDD systems, which results in both base stations having the same symbol timing. The DL symbol timing for UE1 (e.g., 502)

is $T_0+T_{d1}$, with $T_{d1}$ being the channel delay between UE1 (e.g., 502) and its corresponding base station (e.g., 504). The DL symbol timing for UE2 (e.g., 508) is $T_0+T_{d2}$, with $T_{d2}$ being the channel delay between UE2 (e.g., 508) and its serving base station (e.g., 510). The UL symbol timing (e.g., CLI signal transmission timing) at UE1 (e.g., 502) is $$T_{UL1}=T_0+T_{d1}-T_{TA1}=T_0-T_{d1}-N_{TA,offset}T_s$$

where $T_{TA1}$ is the UL timing advance of UE1 (e.g., 502), and $T_{TA1}\approx 2T_{d1}\,N_{TA,offset}T_s$, where $N_{TA,offset}T_s$ is a constant value, and $T_s$ is the nominal sample duration. The symbol timing of the CLI signal (e.g., 518) at UE2 (e.g., 508) is $$T_{CLI}=T_{UL1}+T_{12}=T_0-T_{d1}-N_{TA,offset}T_s+T_{12}$$

where $T_{12}$ is the delay between UE1 (e.g., 502) and UE2 (508).

The UL symbol timing at UE2 (e.g., 508) is $$T_{UL2}=T_0+T_{d2}-T_{TA2}=T_0-T_{d2}-N_{TA,offset}T_s.$$

Taking the difference of the symbol timing of the CLI signal at UE2 and the UL symbol timing at UE2 results with $$T_{CLI}-T_{UL2}=-T_{d1}+T_{12}+T_{d2}.$$

In the above equation, it is reasonable to assume that $T_{12}$ is zero, due in part to the UEs (e.g., UE1 and UE2) being in close proximity to each other. Under such assumption, the symbol timing of the CLI signal at UE2 may be determined by the difference of the channel delays from the base stations to the respective UEs. For example, the symbol timing of the CLI signal at UE2 may be determined by $$T_{d2}-T_{d1}.$$

UE2 may determine $T_{d2}$, but UE2 may not be configured to determine $T_{d1}$.

In order for UE2 to determine $T_{d2}-T_{d1}$, UE2 may utilize the downlink signals from the corresponding base stations to determine $T_{d1}$. In some aspects, UE2 or the UE configured to measure the CLI signal, may determine $T_{d2}-T_{d1}$ (e.g., 712) based on the synchronization signals (e.g., SSB, 702, 704) received from the corresponding base stations. Acquisition of the synchronization signal from neighbor cells may be a part of mobility control procedures for UEs. Thus, acquisition of the synchronization signal might not increase the complexity of the UE implementation.

In instances where UE1 and UE2 are in close proximity to each other, the propagation delay $T_{s1}$ 606 of the synchronization signal (e.g., SSB1 602 or SSB1 702) from the base station (e.g., 504) serving UE1 received at UE2 (e.g., UE2 508) is approximately the same as the channel delay $T_{d1}$ from base station 504 to UE1, such that $T_{s1}\approx T_{d1}$. UE2 may not know the transmit time of SSB1 602, and as such, does not know $T_{s1}$. However, UE2 may be configured to measure the delay difference between SSB1 602 and the synchronization signal (e.g., SSB2 604) transmitted by base station 510 to UE2 508. This delay difference is $$\Delta T_s=(T_{s2,tx}+T_{s2})-(T_{s1,tx}+T_{s1}),$$

where $T_{s1,tx}$ is the transmission time of SSB1 602, $T_{s2,tx}$ is the transmission time of SSB2 604. The difference of $T_{s2,tx}-T_{s1,tx}$ is a known value, based on the configuration of the synchronization signals (e.g., SSB1 and SSB2) of the respective base stations (e.g., 504, 510).

Removing the contribution of $T_{s2,tx}-T_{s1,tx}$ from $\Delta T_s$ results in $T_{s2}-T_{s1}=\Delta T_s-(T_{s2,tx}-T_{s1,tx})$, and replacing $T_{d2}-T_{d1}$ with $T_{s2}-T_{s1}$ to get $T_{CLI}-T_{UL2}$ which is the difference between symbol timing of the CLI signal when it arrives at UE2 and the UL symbol timing of UE2, $T_{CLI}-T_{UL2}=T_{12}+T_{s2}\,T_{s1}.$ As indicated above, $T_{12}$ may be ignored due to the UEs being in close proximity, results in $T_{CLI}-T_{UL2}=T_{s2}-T_{s1}=\Delta T_s-(T_{s2,tx}-T_{s1,tx})$. To get $T_{CLI}-T_{DL2}$, which is the timing difference between the CLI signal (e.g., UL signal 518) when it arrives at UE2 and the DL symbol timing of UE2, by using $T_{DL2}=T_{TA2}+T_{UL2}$, which results in $$T_{CLI}-T_{DL2}=T_{s2}-T_{s1}+T_{TA2}=\Delta T_s-(T_{s2,tx}-T_{s1,tx})+T_{TA2}.$$

Both $T_{CLI}-T_{UL2}$ and $T_{CLI}\,T_{DL2}$ may be utilized to determine the timing of the CLI signal $T_{CLI}$. As a result, UE2 may determine the CLI signal measurement based on $T_{CLI}$.

Figure 8:
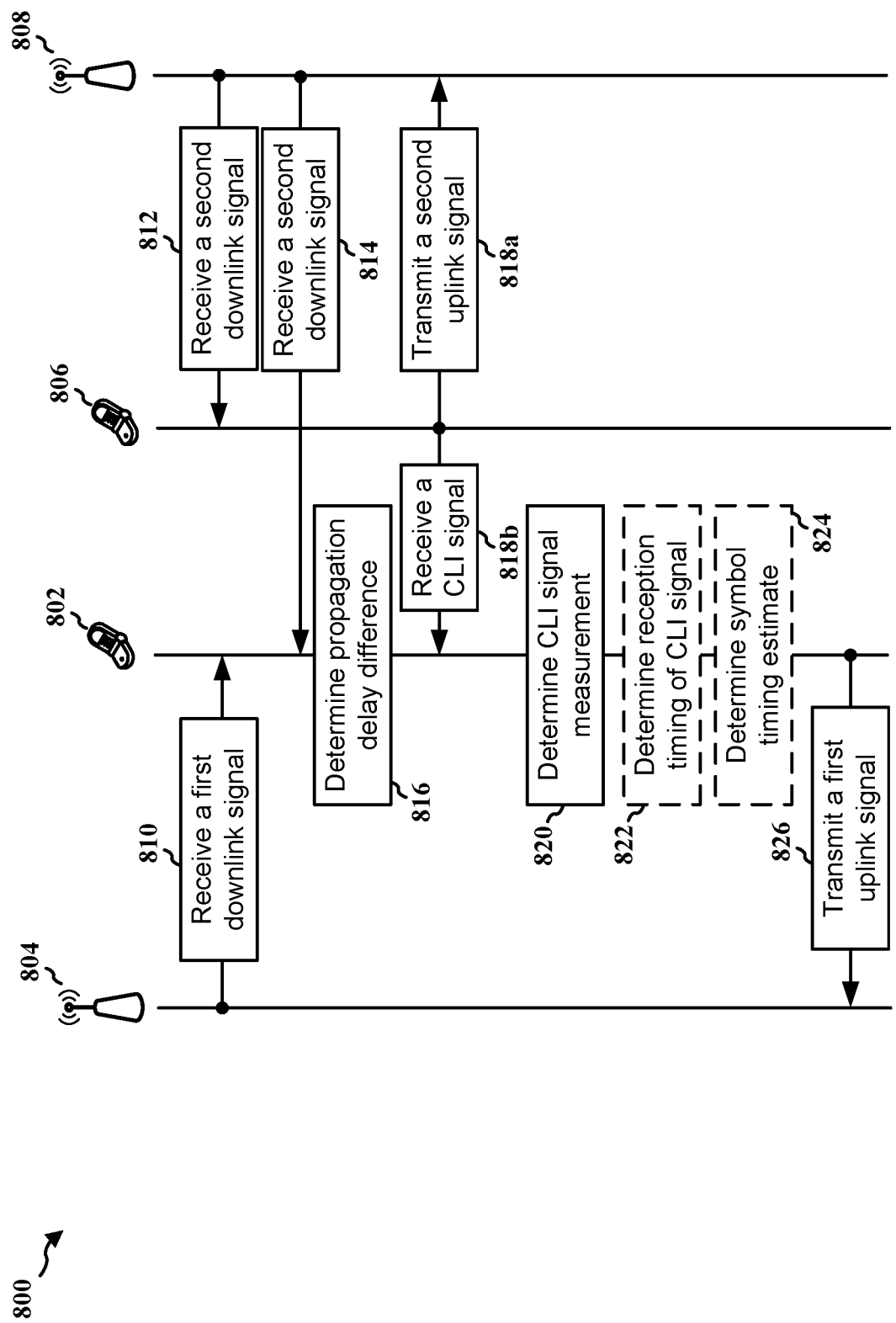
FIG. 8 illustrates an example communication flow between base stations and UEs.

FIG. 8 is an example communication flow 800 between base stations and UEs in accordance with certain aspects of the disclosure. The aspect of FIG. 8 includes a first base station 804 (e.g., base station 510), a first UE 802 (e.g., UE2 508), a second base station 808 (e.g., base station 504), and a second UE 806 (e.g., UE1 502). The first UE 802 is being served by the first base station 804, while the second UE 806 is being served by the second base station 808.

In the illustrated example of FIG. 8, at 810, the first UE 802 may receive a first downlink signal from the first base station. In some aspects, the first downlink signal may include a synchronization signal (e.g., SSB) for the first base station. As discussed above, the first UE 802 may utilize the first downlink signal to determine the propagation delay between the first UE 802 and the first base station 804. In some aspects, the first UE 802 may determine the symbol timing of the first downlink signal from the first base station 804.

At 812, the second UE 806 may receive a second downlink signal from the second base station 808. In some aspects, the second downlink signal may include a synchronization signal (e.g., SSB) for the second base station.

At 814, the first UE 802 may receive the second downlink signal from the second base station 808. As discussed above, the first UE 802 may utilize the second downlink signal from the second base station 808 to determine the propagation delay between the second UE 806 and the second base station 808. In some aspects, the first UE 802 may determine the symbol timing of the second downlink signal from the second base station 808.

At 816, the first UE 802 may determine the propagation delay difference between the first downlink signal and the second downlink signal. In some aspects, a symbol timing difference between the first downlink signal from the first base station and the second downlink signal from the second base station may be similar to the propagation delay difference between the first downlink signal and the second downlink signal.

At 818a, the second UE 806 may transmit a second uplink signal to the second base station 808. At 818b, the second UE 802 may receive the second uplink signal from the second UE 806 in the form of a CLI signal.

At 820, the first UE 802 may determine a CLI signal measurement from the second UE received at the first UE. In some aspects, the CLI signal measurement may be based on the propagation delay difference, which may be based on the first downlink signal and the second downlink signal. The propagation delay difference may be based on the difference between the propagation time of the first and second downlink signals.

In some aspects, the first UE 802, at 822, may determine a reception timing of the CLI signal based on the propagation delay difference between the first downlink signal and the second downlink signal, in order to determine the CLI signal measurement. In some aspects, the first UE 802, at 824, may determine a symbol timing estimate between the CLI signal received at the first UE 802 and a signal between the first UE 802 and the first base station 804 that is interfered by the CLI signal, in order to determine the CLI signal measurement. In some aspects, the symbol timing estimate may be based on the symbol timing difference between the first downlink signal and the second downlink signal.

At 826, the first UE 802 may transmit a first uplink signal to the first base station 804.

Figure 9:
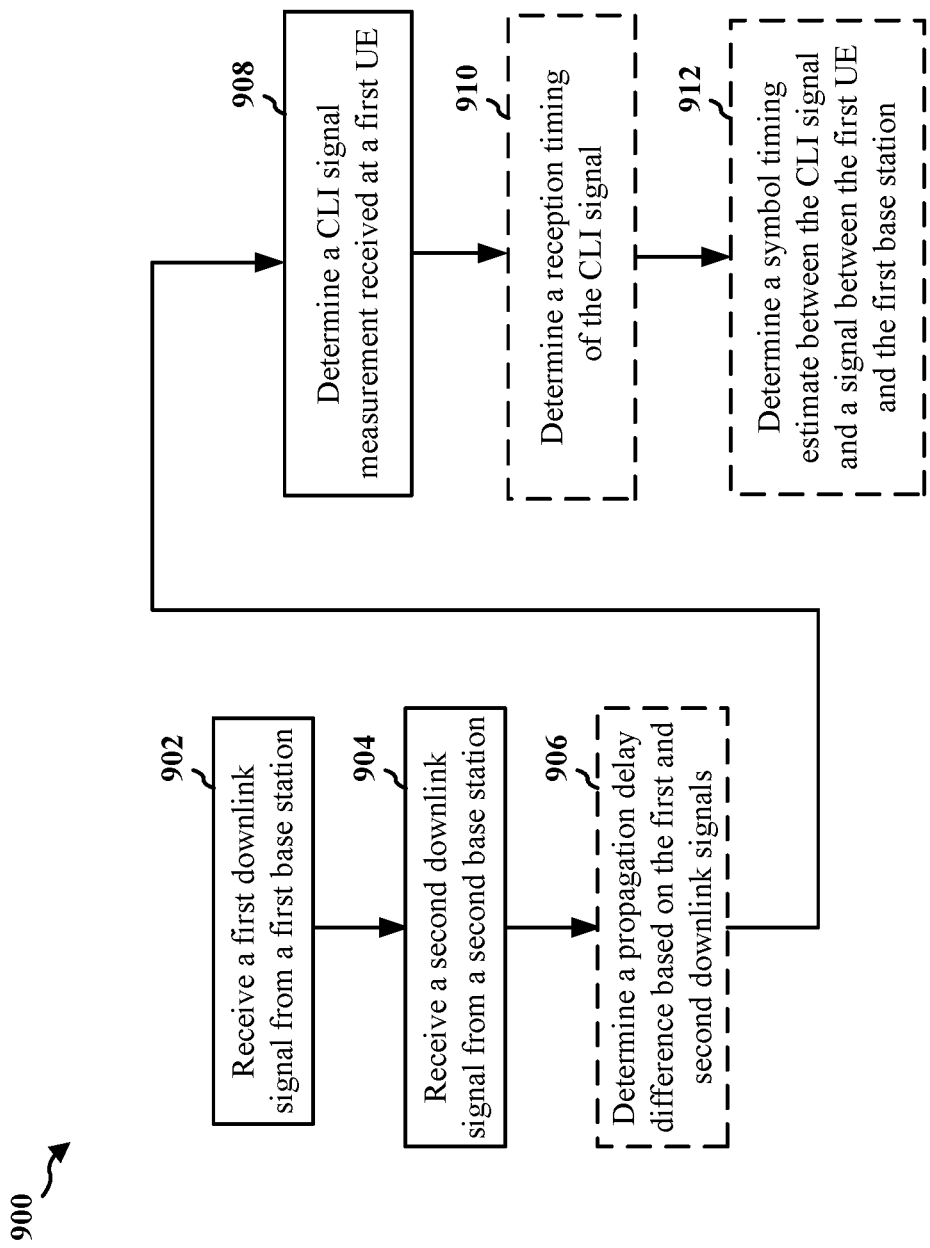
FIG. 9 is a flowchart of a method of wireless communication.

FIG. 9 is a flowchart 900 of a method of wireless communication. The method may be performed by a UE (e.g., the UE 104, 350, 508, 802; the apparatus 1002/1002'; the processing system 1114, which may include the memory 360 and which may be the entire UE or a component of the UE, such as the TX processor 368, the RX processor 356, and/or the controller/processor 359). Aspects of the method may assist a UE to efficiently determine the reception timing of the transmitted CLI signal in order to accurately measure the CLI signal.

Figure 10:
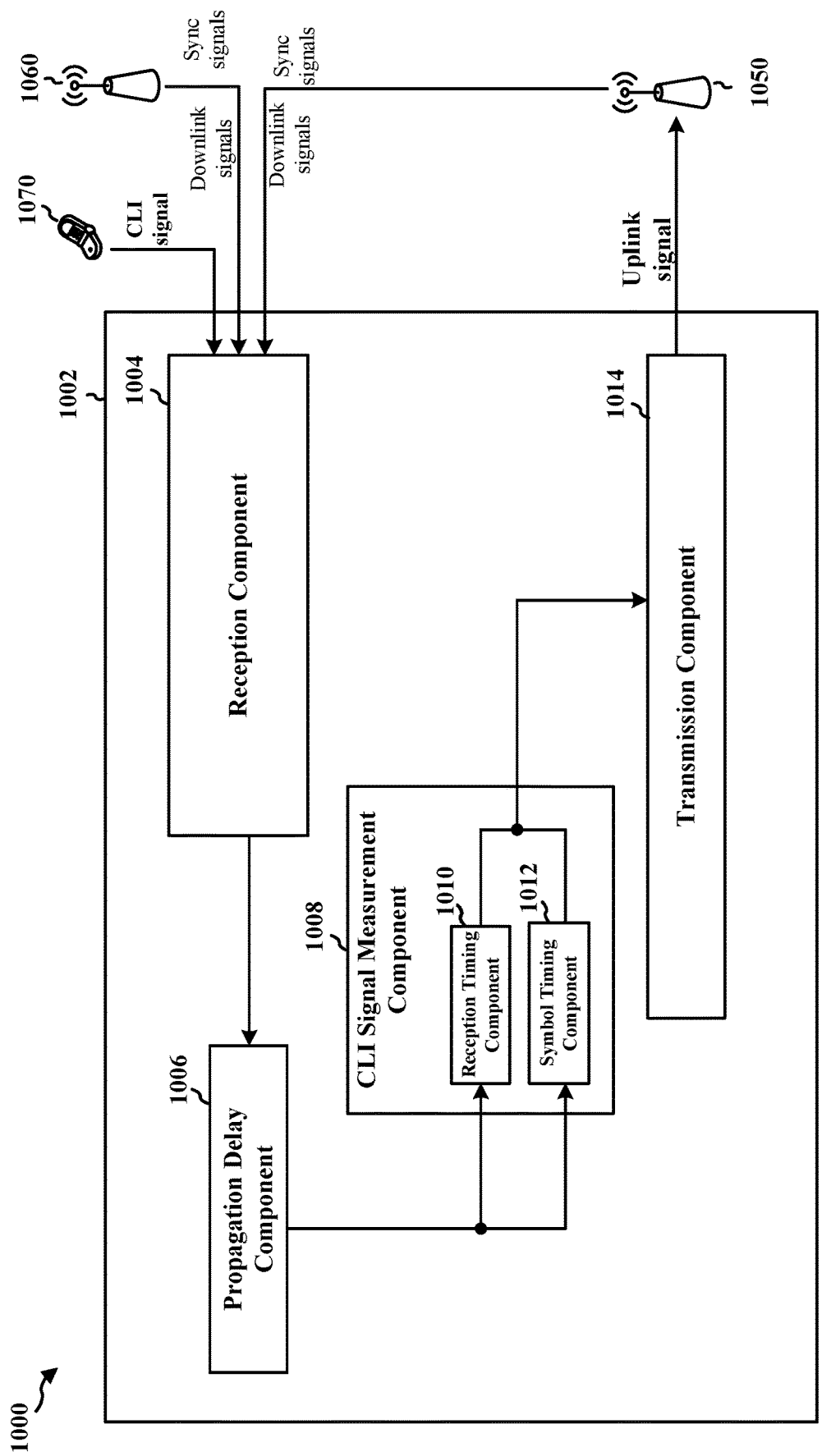
FIG. 10 is a conceptual data flow diagram illustrating the data flow between different means/components in an example apparatus.

At 902, the UE may receive a first downlink signal (e.g., 604, 704, 810) from a first base station (e.g., 510, 804) as shown in connection with FIGS. 6-8. For example, 902 may be performed by reception component 1004, such that the reception component 1004 receives the downlink signal from base station 1050. In some aspects, the first downlink signal may include a first synchronization signal (e.g., 604, 704) as shown in connection with FIGS. 5-7. In some aspects, as shown in FIG. 10, the downlink signal from base station 1050 may include sync signals that are received by the reception component 1004. At 904, the UE may receive a second downlink signal (e.g., 602, 702, 814) from a second base station (e.g., 504, 808) as shown in connection with FIGS. 6-8. For example, 904 may be performed by reception component 1004, such that the reception component 1004 receives the downlink signal from base station 1060. In some aspects, the second downlink signal may include a second synchronization signal (e.g., 602, 702) as shown in connection with FIGS. 5-7.

At 906, the UE may determine a propagation delay difference based on a difference between a propagation time 608 of the first downlink signal and a propagation time 606 of the second downlink signal as shown in connection with FIG. 6. For example, 906 may be performed by propagation delay component 1006, such that the propagation delay component 1006 determines a difference between the propagation time of the downlink signal from base station 1050 and the propagation time of the downlink signal from base station 1060. In some aspects, the propagation delay difference 706 between the first downlink signal (e.g., 604, 704, 810) and the second downlink signal (e.g., 602, 702, 814) may be similar to a symbol timing difference 712 between the first downlink signal (e.g., 604, 704, 810) from the first base station (e.g., 510, 804, 1050) and the second downlink signal (e.g., 602, 702, 814) from the second base station (e.g., 504, 808, 1060).

At 908, the UE may determine a CLI signal (e.g., 518, 708, 818) measurement from a second UE (e.g., 152, 502, 806, 1070) received at the first UE (e.g., 104, 350, 508, 802; the apparatus 1002/1002'; the processing system 1114) based on a propagation delay difference. In some aspects, the propagation delay difference may be based on the first downlink signal (e.g., 604, 704, 810) and the second downlink signal (e.g., 602, 702, 814). For example, 908 may be performed by CLI signal measurement component 1008. The CLI signal measurement component 1008 may receive, as input, the results of the propagation delay component 1006 to perform 908. In some aspects, for example at 910, to determine the CLI signal measurement, the UE (e.g., 104, 350, 508, 802; the apparatus 1002/1002'; the processing system 1114) may determine a reception timing of the CLI signal (e.g., 518, 708, 818) based on the propagation delay difference between the first downlink signal (e.g., 604, 704, 810) and the second downlink signal (e.g., 602, 702, 814). For example, 910 may be performed by reception timing component 1010. The reception timing component 1010 may receive as input the results of the propagation delay component 1006.

At 912, the UE (e.g., 104, 350, 508, 802; the apparatus 1002/1002'; the processing system 1114) may determine a symbol timing estimate between the CLI signal (e.g., 518, 708, 818) received at the first UE (e.g., 104, 350, 508, 802; the apparatus 1002/1002'; the processing system 1114) and a signal (e.g., 710, 820) between the first UE and the first base station that is interfered by the CLI signal (e.g., 518, 708, 818). In some aspects, the symbol timing estimate may be based on the symbol timing difference between the first downlink signal (e.g., 604, 704, 810) and the second downlink signal (e.g., 602, 702, 814). For example, 912 may be performed by the symbol timing component 1012. In some aspects, the propagation delay difference between the first downlink signal (e.g., 604, 704, 810) and the second downlink signal (e.g., 602, 702, 814) may be similar to the symbol timing difference between the first downlink signal (e.g., 604, 704, 810) from the first base station (e.g., 510, 804) and the second downlink signal (e.g., 602, 702, 814) from the second base station (e.g., 504, 808). As discussed above, the propagation delay difference may be used interchangeably with the symbol timing difference, in accordance with the aspects of the disclosure. Thus, the symbol timing component 1012 may receive as input the results of the propagation delay component 1006 to determine the symbol timing difference.

FIG. 10 is a conceptual data flow diagram 1000 illustrating the data flow between different means/components in an example apparatus 1002. The apparatus may be a UE. The apparatus includes a reception component 1004 that may receive a first downlink signal from the first base station 1050, e.g., as described in connection with 902 of FIG. 9. The reception component 1004 may receive a second downlink signal from the second base station 1060, as described in connection with 904 of FIG. 9. The reception component 1004 may receive a CLI signal from the second UE 1070, e.g., as described in connection with 908 of FIG. 9. The apparatus includes a propagation delay component 1006 that determines the propagation delay difference based on the difference between the propagation time of the first downlink signal and the propagation time of the second downlink signal, e.g., as described in connection with 906 of FIG. 9. The apparatus includes a CLI signal measurement component 1008 that determines CLI signal measurement from the second UE received at the first UE based on the propagation delay difference, e.g., as described in connection with 908 of FIG. 9. In some aspects, the apparatus may include a reception timing component 1010 that determines the reception timing of the CLI signal based on the propagation delay difference between the first downlink signal and the second downlink signal, e.g., as described in connection with 910 of FIG. 9. In some aspects, the apparatus may include a symbol timing component 1012 that determines the symbol timing estimate between the CLI signal received at the first UE and a signal between the first UE and the first base station that is interfered by the CLI signal, e.g., as described in connection with 912 of FIG. 9. The apparatus may include a transmission component 1014 that transmits uplink signals to the first base station 1050.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
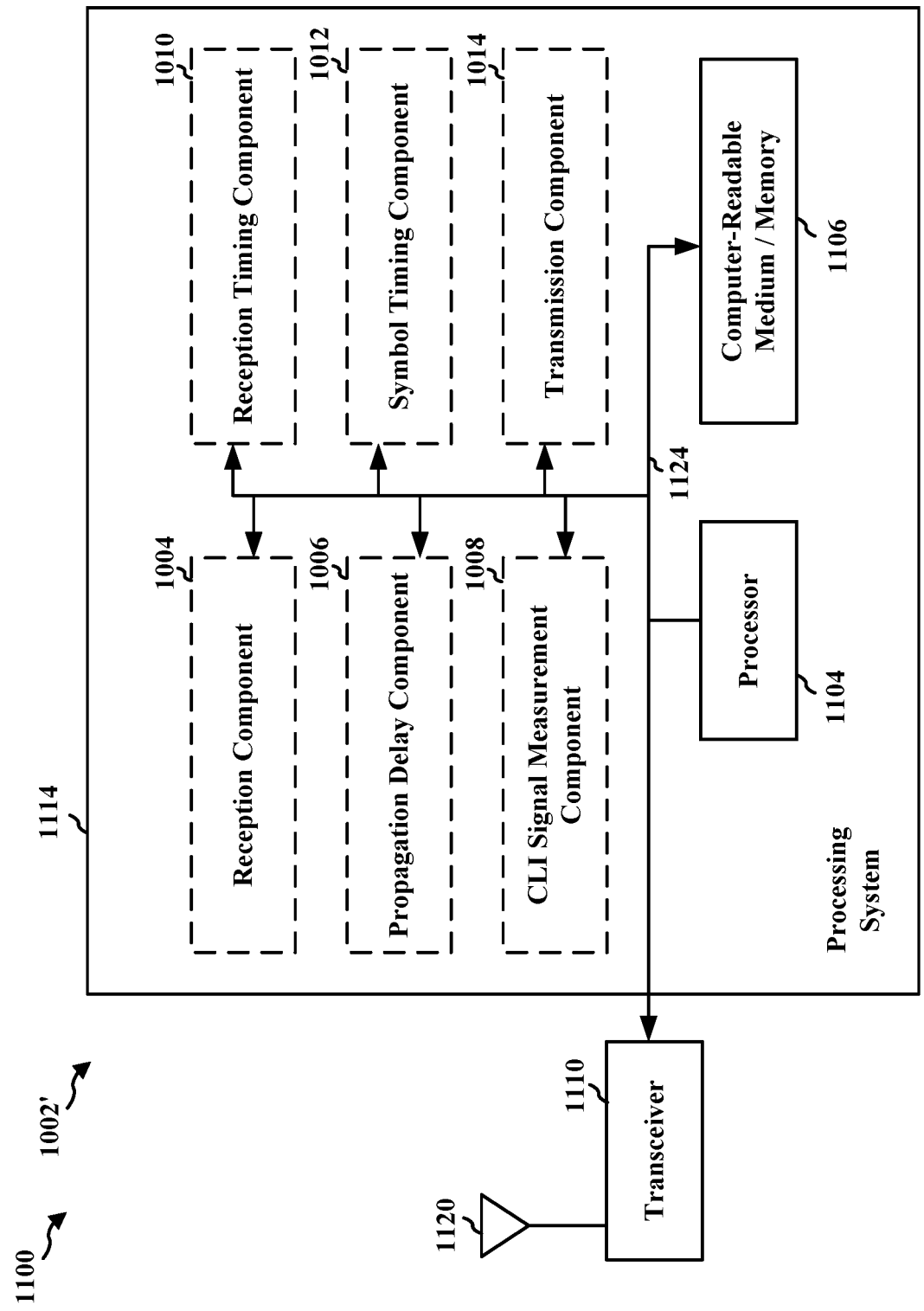
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1014, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1002/1002' for wireless communication includes means for receiving a first downlink signal from a first base station. The apparatus includes means for receiving a second downlink signal from a second base station. The apparatus includes means for determining a cross-link interference (CLI) signal measurement from a second UE received at the first UE based on a propagation delay difference. In some aspects, the propagation delay difference may be based on the first downlink signal and the second downlink signal. The apparatus may further include means for determining the propagation delay difference based on a difference between a propagation time of the first downlink signal and a propagation time of the second downlink signal. The apparatus may further include means for determining a reception timing of the CLI signal based on the propagation delay difference between the first downlink signal and the second downlink signal. The apparatus may further include means for determining a symbol timing estimate between the CLI signal received at the first UE and a signal between the first UE and the first base station that is interfered by the CLI signal. In some aspects, the symbol timing estimate may be based on the symbol timing difference between the first downlink signal and the second downlink signal. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The disclosure provides an optimized technique for UEs to determine the reception timing of a transmitted CLI signal, which in turn allows UEs to accurately measure CLI signals. At least one advantage of the disclosure is that UEs may determine the timing difference between neighbor cell and its serving cell based on the received synchronization signal received from the respective cells. The UE may use the timing difference of the synchronization signal as the difference between the channel delay from the UE that transmits the CLI signal to the corresponding base station and the channel delay from itself to its serving base station. The acquisition of synchronization signals of serving cells and neighbor cells is already part of the UE implementation, such that the complexity of the UE implementation is not increased. As such, the disclosure may be applicable to any CLI scenario and does not impact the complexity of the UE implementation.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for measuring cross-link interference in wireless communications at a first User Equipment (UE), comprising:
   receiving a first downlink signal from a first base station;
   receiving a second downlink signal from a second base station; and
   determining a cross-link interference (CLI) signal measurement from a second UE received at the first UE based on a propagation delay difference, the propagation delay difference being based on the first downlink signal and the second downlink signal.

2. The method of claim 1, further comprising:
   determining the propagation delay difference based on a difference between a propagation time of the first downlink signal and a propagation time of the second downlink signal.

3. The method of claim 1, wherein the first downlink signal comprises a first Synchronization Signal from the first base station, and wherein the second downlink signal comprises a second synchronization signal from the second base station.

4. The method of claim 1, wherein determining the CLI signal measurement includes determining a reception timing of a CLI signal based on the propagation delay difference between the first downlink signal and the second downlink signal.

5. The method of claim 4, wherein the propagation delay difference between the first downlink signal and the second downlink signal is similar to a symbol timing difference between the first downlink signal from the first base station and the second downlink signal from the second base station.

6. The method of claim 5, wherein determining the CLI signal measurement further includes:
   determining, based on the symbol timing difference between the first downlink signal and the second downlink signal, a symbol timing estimate between the CLI signal received at the first UE and a signal between the first UE and the first base station that is interfered by the CLI signal.

7. An apparatus for measuring cross-link interference in wireless communications at a first User Equipment (UE), comprising:
   means for receiving a first downlink signal from a first base station;
   means for receiving a second downlink signal from a second base station; and
   means for determining a cross-link interference (CLI) signal measurement from a second UE received at the first UE based on a propagation delay difference, the propagation delay difference being based on the first downlink signal and the second downlink signal.

8. The apparatus of claim 7, further comprising:
   means for determining the propagation delay difference based on a difference between a propagation time of the first downlink signal and a propagation time of the second downlink signal.

9. The apparatus of claim 7, wherein the first downlink signal comprises a first Synchronization Signal from the first base station, and wherein the second downlink signal comprises a second synchronization signal from the second base station.

10. The apparatus of claim 7, wherein the means for determining the CLI signal measurement includes means for determining a reception timing of a CLI signal based on the propagation delay difference between the first downlink signal and the second downlink signal.

11. The apparatus of claim 10, wherein the propagation delay difference between the first downlink signal and the second downlink signal is similar to a symbol timing difference between the first downlink signal from the first base station and the second downlink signal from the second base station.

12. The apparatus of claim 11, wherein the means for determining the CLI signal measurement further includes:
   means for determining, based on the symbol timing difference between the first downlink signal and the second downlink signal, a symbol timing estimate between the CLI signal received at the first UE and a signal between the first UE and the first base station that is interfered by the CLI signal.

13. An apparatus for measuring cross-link interference in wireless communications at a first User Equipment (UE), comprising:
   a memory; and
   at least one processor coupled to the memory and configured to:
   receive a first downlink signal from a first base station;
   receive a second downlink signal from a second base station; and
   determine a cross-link interference (CLI) signal measurement from a second UE received at the first UE based on a propagation delay difference, the propagation delay difference being based on the first downlink signal and the second downlink signal.

14. The apparatus of claim 13, wherein the at least one processor further configured to:
   determine the propagation delay difference based on a difference between a propagation time of the first downlink signal and a propagation time of the second downlink signal.

15. The apparatus of claim 13, wherein the first downlink signal comprises a first Synchronization Signal from the first base station, and wherein the second downlink signal comprises a second synchronization signal from the second base station.

16. The apparatus of claim 13, wherein to determine the CLI signal measurement, the at least one processor further configured to:
 determine a reception timing of a CLI signal based on the propagation delay difference between the first downlink signal and the second downlink signal.

17. The apparatus of claim 16, wherein the propagation delay difference between the first downlink signal and the second downlink signal is similar to a symbol timing difference between the first downlink signal from the first base station and the second downlink signal from the second base station.

18. The apparatus of claim 17, wherein to determine the CLI signal measurement, the at least one processor further configured to:
 determine, based on the symbol timing difference between the first downlink signal and the second downlink signal, a symbol timing estimate between the CLI signal received at the first UE and a signal between the first UE and the first base station that is interfered by the CLI signal.

19. A non-transitory computer-readable medium storing computer executable code for wireless communication at a first User Equipment (UE), the code when executed by at least one processor cause the at least one processor to:
 receive a first downlink signal from a first base station;
 receive a second downlink signal from a second base station; and
 determine a cross-link interference (CLI) signal measurement from a second UE received at the first UE based on a propagation delay difference, the propagation delay difference being based on the first downlink signal and the second downlink signal.

20. The non-transitory computer-readable medium of claim 19, the code when executed by the at least one processor further configured to cause the at least one processor to:
 determine the propagation delay difference based on a difference between a propagation time of the first downlink signal and a propagation time of the second downlink signal.

21. The non-transitory computer-readable medium of claim 19, wherein the first downlink signal comprises a first Synchronization Signal from the first base station, and wherein the second downlink signal comprises a second synchronization signal from the second base station.

22. The non-transitory computer-readable medium of claim 19, to determine the CLI signal measurement the code when executed by the at least one processor further configured to cause the at least one processor to:
 determine a reception timing of the CLI signal based on the propagation delay difference between the first downlink signal and the second downlink signal.

23. The non-transitory computer-readable medium of claim 22, wherein the propagation delay difference between the first downlink signal and the second downlink signal is similar to a symbol timing difference between the first downlink signal from the first base station and the second downlink signal from the second base station.

24. The non-transitory computer-readable medium of claim 23, to determine the CLI signal measurement the code when executed by the at least one processor further configured to cause the at least one processor to:
 determine, based on the symbol timing difference between the first downlink signal and the second downlink signal, a symbol timing estimate between the CLI signal received at the first UE and a signal between the first UE and the first base station that is interfered by the CLI signal.

* * * * *